(12) United States Patent
Chen

(10) Patent No.: US 6,611,423 B2
(45) Date of Patent: Aug. 26, 2003

(54) INDUSTRIAL COMPUTER CASING

(75) Inventor: Chih-Chung Chen, Taipei (TW)

(73) Assignee: Portwell Inc., Taipei (TW)

( * ) Notice: Subject to any disclaimer, the term of this patent is extended or adjusted under 35 U.S.C. 154(b) by 166 days.

(21) Appl. No.: 09/925,329

(22) Filed: Aug. 10, 2001

(65) Prior Publication Data

US 2003/0030974 A1 Feb. 13, 2003

(51) Int. Cl.[7] .................................................. G06F 1/16
(52) U.S. Cl. ...................... 361/683; 312/223.2; 361/758; 361/685
(58) Field of Search ................................ 361/679–686, 361/724–727, 758; 312/223.1–223.2; 248/682

(56) References Cited

U.S. PATENT DOCUMENTS

| | | | | |
|---|---|---|---|---|
| 4,992,903 A | * | 2/1991 | Chen ........................... | 361/685 |
| 5,136,468 A | * | 8/1992 | Wong et al. ................. | 361/683 |
| 5,197,789 A | * | 3/1993 | Lin ............................ | 312/223.2 |
| 6,229,699 B1 | * | 5/2001 | Kerrigan et al. ............. | 361/684 |
| 6,313,984 B1 | * | 11/2001 | Furay .......................... | 361/685 |

* cited by examiner

*Primary Examiner*—Darren Schuberg
*Assistant Examiner*—Lisa Lea-Edmonds
(74) *Attorney, Agent, or Firm*—Troxell Law Office PLLC

(57) ABSTRACT

The present invention relates to an improved industrial computer casing with a height below 2U, and such computer casing has a plurality of supporting posts with different heights, and a corresponding protruded ear base on each lateral side of the computer casing, so that when the casing is in use, a motherboard can be secured onto the supporting post. If needed, the hard disk drive frame can be embedded into the ear base and then the hard disk drive can be secured to the hard disk drive frame or the hard disk drive frame is secured between the supporting posts by means of the conformation of hard disk drive frame on the convex screw base such that motherboard and a hard disk drive or an interface card are able to be securely accommodated into the casing to reduce the occupied space of the overall casing.

4 Claims, 6 Drawing Sheets

INDUSTRIAL COMPUTER CASING

BACKGROUND OF THE INVENTION

1. Field of the Invention

The present invention relates to an improved industrial computer casing, more particularly to an improved industrial computer casing having a base and an external casing with the height below 2U (where 1U 4.445 cm) that can accommodate at least a motherboard, a hard disk drive or an interface card depending on the required configuration of the computer casing.

2. Description of the Prior Art

Please refer to FIG. 1 for the traditional industrial computer casing, which comprises an external casing 10 and a base 11, and at least a hard disk drive 20 and a backplane 30, and the backplane 30 further comprises a plurality of slots 31 for the vertical insertion of other interface cards 32, and the blanket 12 of the computer casing 10 has several different functional I/O ports 121 for the connection of I/O ports 121 such as PS2 port, parallel port, serial port, USB port, etc. Since industrial computers are used for specific occasions, and such computers usually have more chances to only execute specific functions such as the firewall system or email server, printer server, proxy server, etc. In general, the traditional industrial computer casing just installs a hard disk drive 20 and a motherboard 33, but still uses the casing of the original design and specification, and therefore it occupies a relatively large space and increases the manufacturing cost.

In view of the shortcomings of the prior art mentioned above, the inventor of the present invention based on years of experience accumulated from the engagement in the related industry conducted extensive research to resolve the foregoing shortcomings and invented the computer casing structure of the present invention.

Therefore, the primary objective of the present invention is to improve the base of the traditional computer casing so that a motherboard, a hard disk drive, and an interface card can be accommodated in the casing with a height of less than 2U. When executing a specific function, it can reduce the overall space occupied by the industrial computer casing. The structure of the base has flanges on both lateral sides, and the flange has inwardly concave screwing base. It works together with a plurality of long and short supporting posts on the case, and the top of the long supporting post supports the motherboard, and the short supporting post is used for installing a hard disk drive frame to mount a hard disk between the hard disk drive frame and an inwardly concave screwing base. Since the motherboard has a slot and is supported by the long supporting posts, the slot allows the insertion of an interface card being inserted parallel to the motherboard.

The secondary objective of the present invention is to focus on the improvement of the external casing and the supporting posts, which allows a motherboard and a hard disk drive being accommodated in a casing with a space of height less than 2U. Firstly, a protruded ear base penetrating the front end and the rear end being disposed on each of the lateral inner sides of the external casing, and the protruded ear base has a hard disk drive frame, and the hard disk drive being mounted onto the hard disk drive frame. A supporting post of a specific length being disposed at a specific position on the base, such that the top of the supporting post is used to support and fix the motherboard, and it will not interfere the installation of the hard disk drive.

By combining the structures of the foregoing two objectives, we can design a commonly shared base of the casing, the external casing, and a hard disk drive to accommodate a motherboard, and a hard disk drive or an interface card into a casing of a space with a height less than 2U.

To make it easier for our examiner to understand the objective of he invention, structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DETAILED DESCRIPTION OF THE PREFERRED EMBODIMENT

Figure 1:
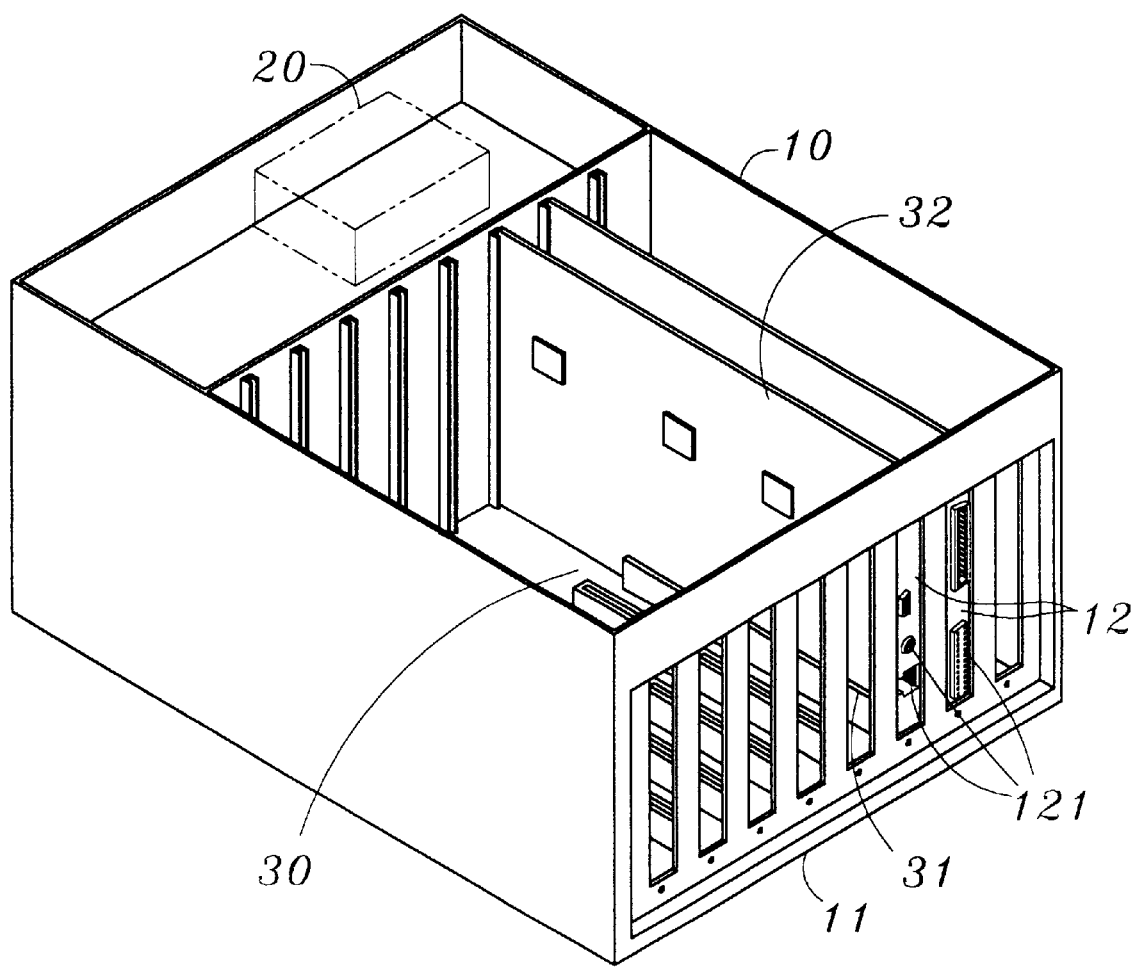
FIG. 1 is a three-dimensional diagram showing the prior art computer casing.
Figure 2:
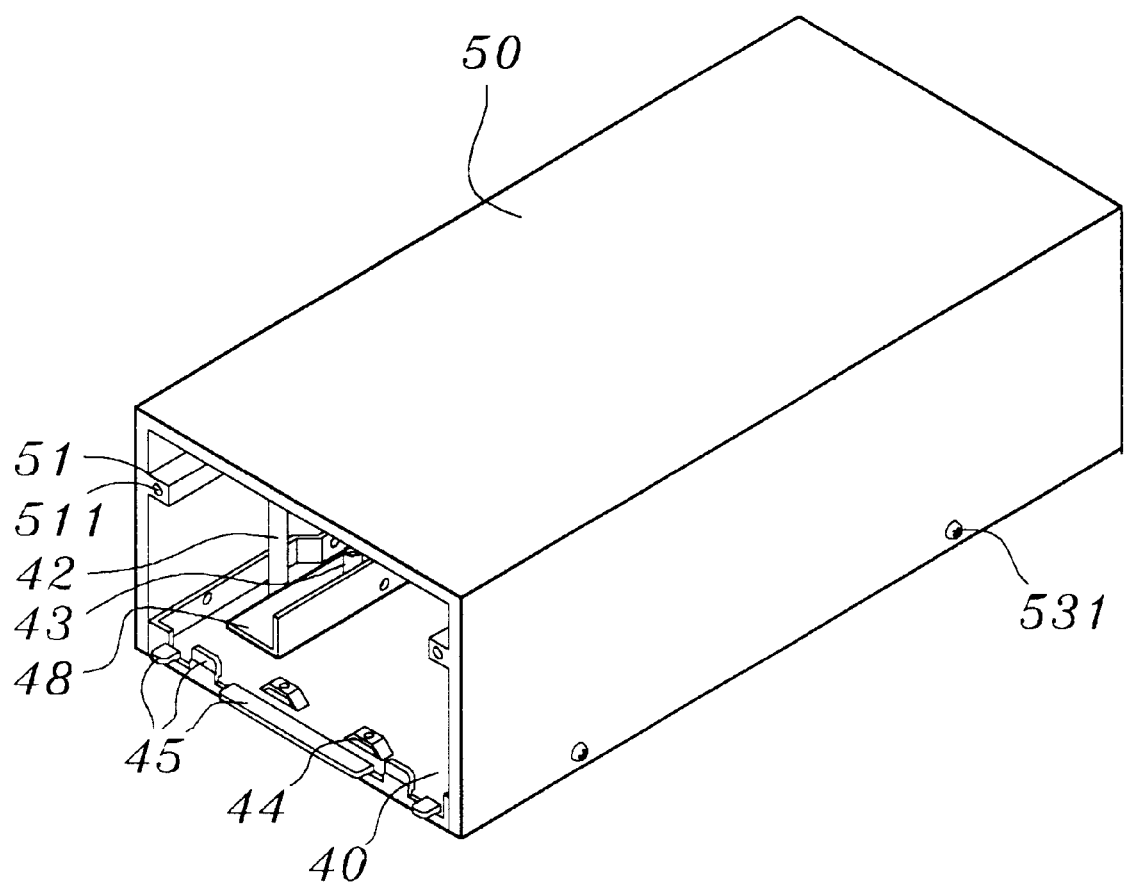
FIG. 2 is a three-dimensional diagram of the present invention.
Figure 3:
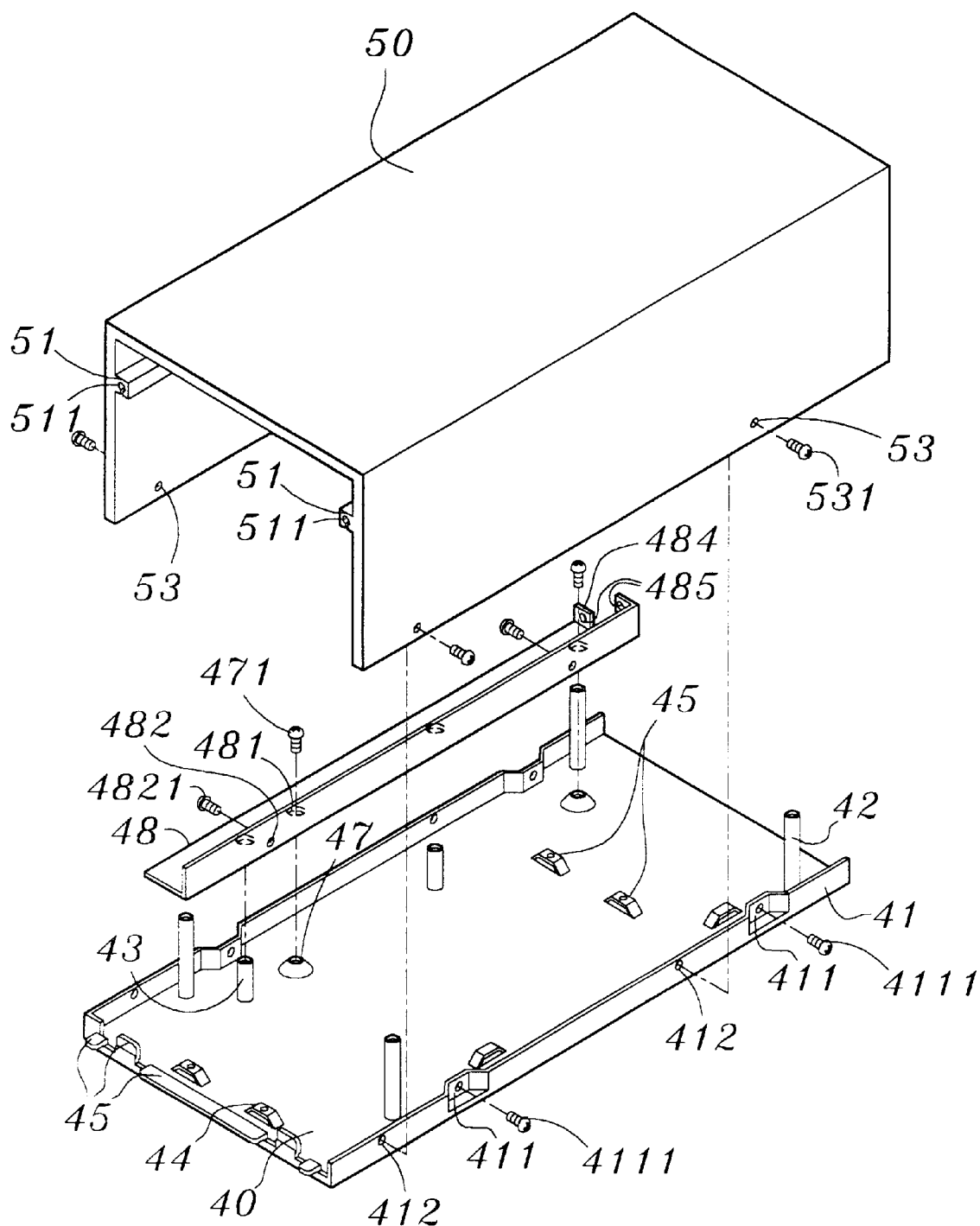
FIG. 3 shows the disassembled parts of the structure according to a preferred embodiment of the present invention.
Figure 5:
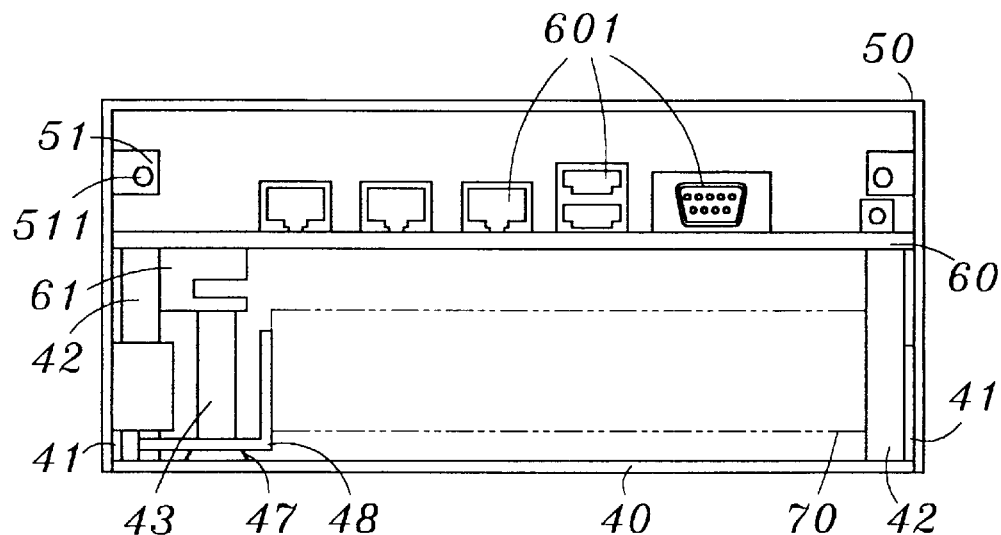
FIG. 5 shows an embodiment of the present invention.
Figure 6:
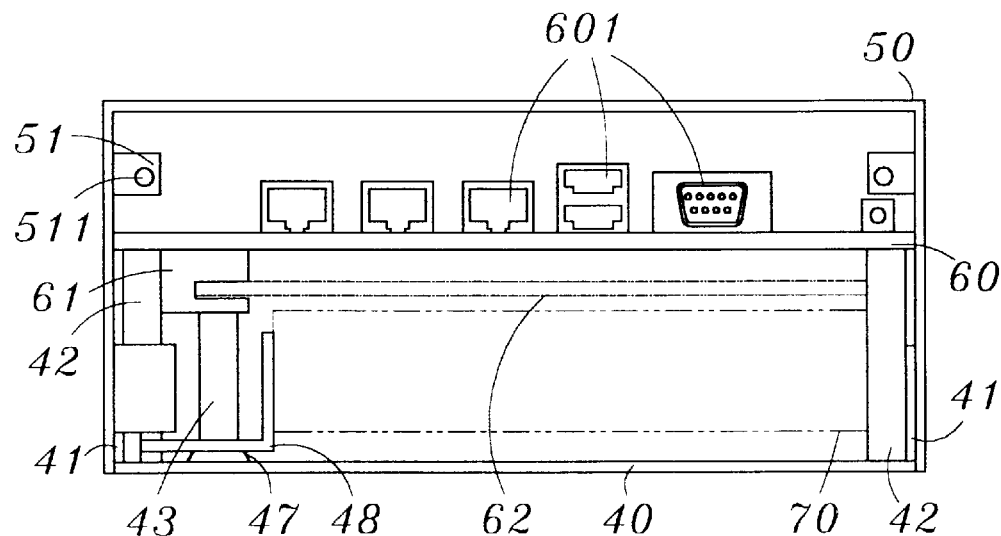
FIG. 6 shows another embodiment of the present invention.

Please refer to FIGS. 2 and 3. The present invention relates to an improved industrial computer, comprising a casing with a height of less than 2U (where 1U=4.445 cm), and the casing her comprising a base 40 and a external casing 50 being fixed on the base 40. The casing 40 has a flange 41 on each lateral side of the square board, and a corresponsive inwardly concave screwing base 411 and a screw hole 412 being disposed at an appropriate position on each side of the flange 41. The base 40 has a plurality of long supporting posts 42 and a plurality of short supporting posts 43, wherein the top of the long supporting post 42 is used to support the motherboard 60 and the short supporting post 43 is used to support the slot 61 (as shown in FIGS. 5 and 6) under the motherboard 60. An embedding screw base 44 and embedding latch 45 are protruded from the front end and the rear end of the base 40 for coupling the front board and the rear board (not shown in the figure). Along the line where the short supporting posts 43 are disposed on the base 40, there is at least one protruded screw base 47.

With the foregoing arrangement of components for the assembly, a hard disk drive 70 can be secured between the inwardly concave screw base 411 of the base 40 and the hard disk drive frame 48 (please refer to FIGS. 3, 5 and 6 at the same time), and the motherboard 60 is secured onto the top of the long supporting posts 42 by screws. The slot 61 under the motherboard 60 are secured and propped by the short supporting posts 43, and an interface card 62 can be inserted into the slot 61 parallel to the motherboard 60. It also allows a motherboard 60, a hard disk drive 70 and an interface card 62 being accommodated in the computer casing in order to reduce the space occupied and enables the I/O ports 601 on the motherboard 60 being electrically coupled to other related and corresponsive ports (not shown in the figure). Working with the software, it can put the predetermined functions into full play.

Furthermore, a protruded ear base 51 being penetrated through the front end and the rear end is disposed on each of the lateral sides of the external casing 50. A screw groove 511 passing through the front end and the rear end is disposed in the protruded ear base 51, and a hard disk frame 48 is disposed on the protruded ear base 51. It will be described in the next diagram.

Figure 4:
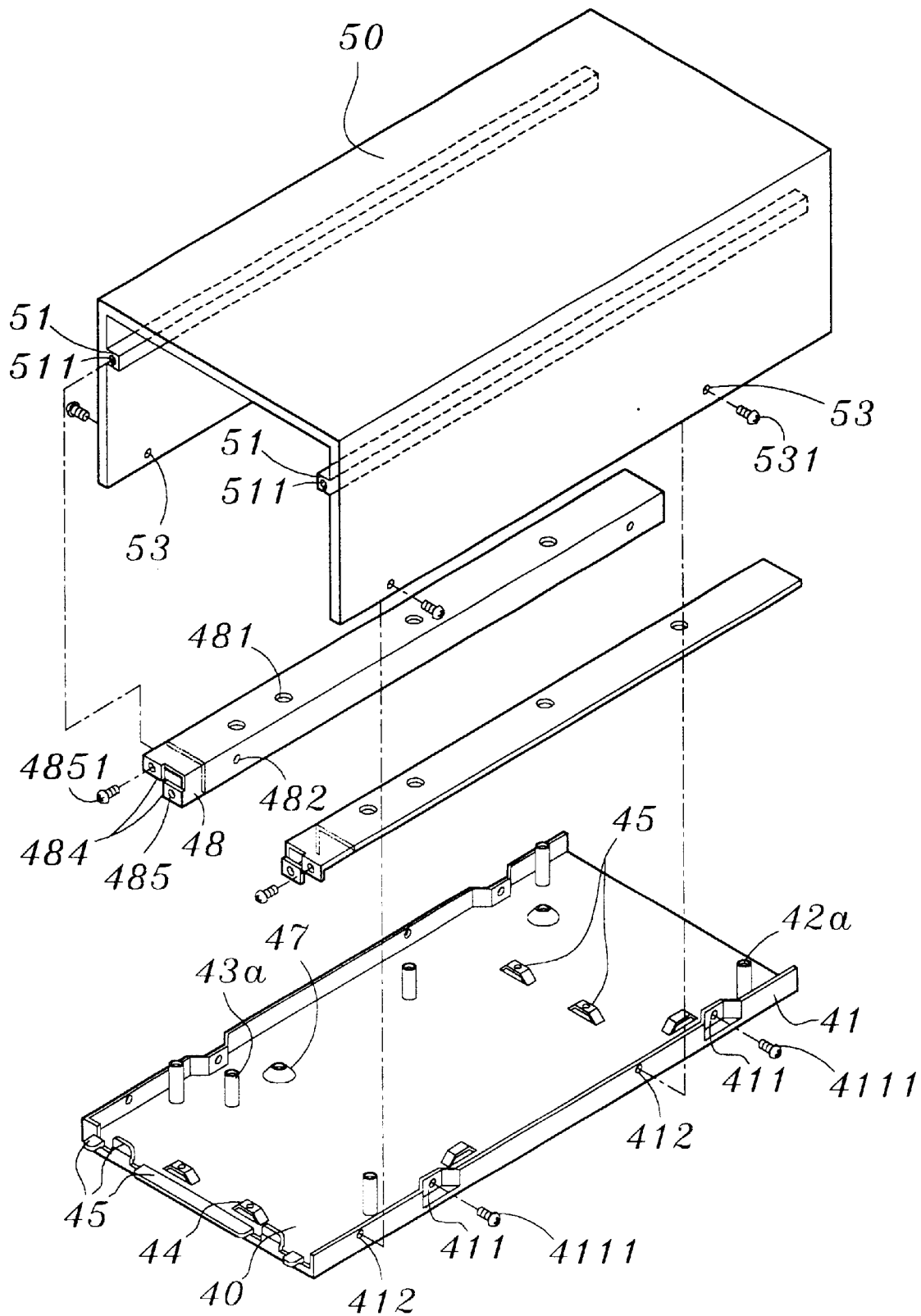
FIG. 4 is a three-dimensional diagram showing the disassembled parts of the structure according to another preferred embodiment of the present invention.
Figure 7:
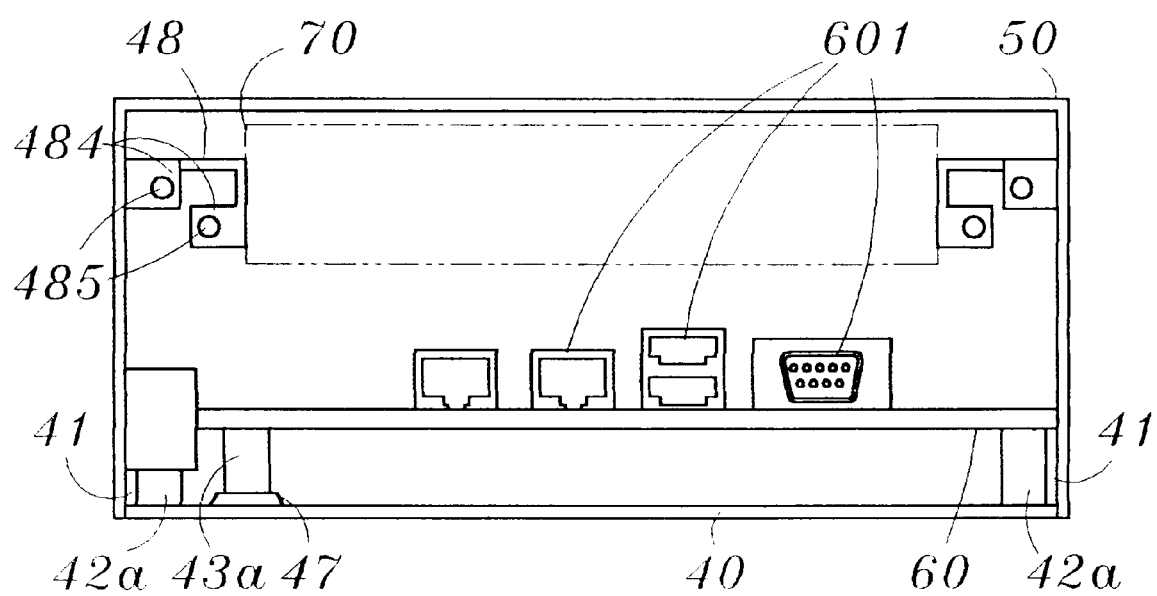
FIG. 7 shows another embodiment of the present invention.

Please refer to FIG. 4, which shows the three-dimensional diagram of another structure of the present invention. A set of inwardly-folded protruded brackets 484 are disposed on the hard disk drive frame 48 in the front end on both sides of the plate being vertical to each other, and a hole 485 being disposed on each of the protruded brackets 484 for fixing the set of protruded brackets 484 to the screw grove 511 by means of the screw components 4851. The screw grove 511 is for coupling the front board and the rear board (not shown in the figure), and a fixing hole 482 is disposed at the lateral sides of the hard disk drive frame 48, and the fixing hole 482 is for accommodation of one end of the screw component in order to screw the hard disk drive 70 (as shown in FIG. 7) between two hard disk drive frames 48. A penetrating hole 53 is disposed on each side of the external casing 50 in order to provide an end of the screw component 531 to fix the external casing 50 to the screw hole 412 of the base 40.

By the foregoing arrangement of components, a hard disk drive 70 can be mounted between two hard disk drive frame 48 (please refer to FIG. 7 as well) and a motherboard 60 can be screwed onto the top of the supporting posts 42a, 43a. It only allows the motherboard 60 and the hard disk drive 70 to be installed in the computer casing such that it can reduce the occupied space in the casing, and allows the electrical connection of the I/O ports 601 on the motherboard 60 with other related and corresponsive ports (not shown in the figure). It can carry out the predetermined function of the computer by working together with appropriate software.

Comparing FIG. 3 with FIG. 4, we can find that the difference between them lies on the hard disk drive frame 48 being substituted by a pair of hard disk drive frames 48 on the external casing 50, and a plurality of holes 481 being disposed on the hard disk drive frame 48 for passing into the short supporting posts 43 and can be disposed on the protruded screw base 47. Please refer to FIG. 6. A slot 61 is disposed under the motherboard 60 so that the slot 61 can be supported by the short supporting posts 43, and a screw hole 482 is disposed on the lateral side of the hard disk drive frame 48. By means of screw components 4821, 4111, it can fix the hard disk drive 70 between the hard disk drive frames 48 and the inwardly concave screwing base 411 such that the hard disk drive 70 can be mounted on the base 40. It is necessary to have the motherboard 60 having slot 61, therefore we have this configuration (the figure shows that the hard disk drive 70 does not occupy the space for inserting any objects into the slot). Since the length of the long supporting posts 42 and the short supporting posts 43 of this embodiment is different from the length of the supporting posts 42a, 43a of the other embodiment. Therefore, the rear board (not shown in the figure) exposes the openings (not shown in the figure) of the I/O ports of the motherboard 60. Such arrangement can successfully install at least a motherboard 60, a hard disk drive 70, and an interface card 62 to a casing of the height less than 2U (where 1U=4.445 cm).

Please continue to refer to FIG. 7. If compared FIG. 7 with the previous figure, you can find that the originally installed interface card 62 is no longer there, and all other components remain unchanged. By the embodiments shown in FIGS. 5 to 7, the present invention is limited by the space of the casing, and it can just select certain configuration. For instance, the present embodiment selects a motherboard 60 working with a hard disk drive 70 or with an interface card 62 are securely coupled to the space in the casing with a height of less than 2U (where 1U=4.445 cm). If two structures with unrelated portion are coupled to the commonly shared base 40, external casing 50, and hard disk drive frame 48. It further works together with the supporting posts 42, 42a, 43, 43a of appropriate length so that at least one hard disk drive 70 and a motherboard 60 are installed in the casing. The embodiment of the present invention is novel.

Therefore, in summation of the above description, the present invention meets the requirements of patentability, which is hereby submitted for patent application.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved industrial computer casing of the height of less than 2U (where 1U equals to 4.445 cm), comprising:
    a base, further comprising a plurality of long supporting posts and short supporting posts, respectively support a motherboard and a slot under the motherboard, a protruded screw base, being disposed along the line of the short supporting posts on the motherboard;
    an external casing, being coupled to the base to form a casing, and a protruded ear base passing through the front end and the rear end on the corresponsive position on the inner side of the external casing, and the protruded ear base has a screw groove penetrating the front end and the rear end; and
    a hard disk drive frame, being fixed on the protruded screw base of the base to facilitate the hard disk drive being mounted to an inwardly concave screw base between the hard disk drive frame and the flange of the base;
    thereby the arrangement of the foregoing elements, at least a motherboard and a hard disk drive or an interface card can be accommodated in the casing to reduce the overall occupied space of the casing.

2. An improved industrial computer casing as claimed in claim 1, wherein said slot of the motherboard is used for the insertion of an interface card being parallel to the motherboard.

3. An improved industrial computer casing as claimed in claim 1, wherein said base is a flat plate having a flange on the lateral side of the base.

4. An improved industrial computer casing of the height of less than 2U (where 1U equals to 4.445 cm), comprising:
    a base, being a flat plate having a flange on the lateral side of the base, and
    comprising a plurality of supporting posts for supporting a motherboard;
    an external casing, being coupled with the base to form a casing, and the external casing has a protruded ear base penetrating the front end and the rear end on the inner corresponding position in the external casing; and at least one hard disk drive frame, being separately disposed on the protruded ear base, and a fixing hole is disposed on the corresponding inner side of the hard disk drive frame for coupling the hard disk drive to the between the hard disk drive frames by screw components;

by means of the foregoing elements of assembly, a motherboard and a hard disk drive can be accommodated in the casing to reduce the occupied space of the overall casing.

* * * * *